March 30, 1965 M. V. TILLETT ETAL 3,175,488
PRINTING AND DYEING OF PILE MATERIAL
Original Filed Aug. 13, 1957 8 Sheets-Sheet 1

INVENTORS,
GEORGE H TILLETT
MARY V. TILLETT
BY Burgess, Ryan & Hicks
ATTORNEYS

INVENTORS.
GEORGE H. TILLETT
MARY V. TILLETT
BY Burgess, Ryan + Hicks
ATTORNEYS

United States Patent Office 3,175,488
Patented Mar. 30, 1965

3,175,488
PRINTING AND DYEING OF PILE MATERIAL
Mary Victoria Tillett and George Hadlow Tillett, Oscawana, N.Y., assignors, by mesne assignments, to Bigelow-Sanford, Inc., New York, N.Y., a corporation of Delaware
Original application Aug. 13, 1957, Serial No. 677,951, now Patent No. 2,984,540, dated May 16, 1961. Divided and this application Mar. 27, 1961, Ser. No. 100,777
19 Claims. (Cl. 101—115)

The present invention relates to the application of colored designs to pile carpeting and constitutes a continuation-in-part of application Serial No. 507,788, filed May 12, 1955, by George and Mary Tillett for Printing and Dyeing of Pile Carpeting, now U.S. Patent No. 2,816,811 issued December 17, 1957, and is a division of their co-pending application Serial No. 677,951, now U.S. Patent No. 2,984,540 issued May 16, 1961.

As pointed out in the aforesaid applications, existing techniques for applying color designs to pile carpeting have proven unsatisfactory. Previous efforts along these lines have been many and have taken the form and use of stencils, screens, air sprays and the like. These methods have resulted in a surface application of the color designs and have proven unsatisfactory. It has been recognized that deep dyeing is preferable but where deep dyeing is to be achieved, it is necessary to resort to methods which are prohibitive in their complexity and which have resulted in an unsatisfactory product. In previous methods, the fabric was soaking wet after introduction of the coloring agent and could, therefore, not be processed further without running or bleeding of the colors, and complicated devices for pre-drying the fabric had to be introduced, resulting in impractically cumbersome equipment and very long printing cycles. This would make the cost of the operation prohibitive even if a satisfactory product had been obtained.

Accordingly, it is the primary object of this invention to make possible the deep dyeing of pile carpeting, in which a plurality of colors may be simultaneously applied to the carpeting without distortion of boundary lines, and in which the coloring agent will penetrate into the pile as deeply as may be desired. To achieve this object, apparatus is provided in which the various areas of the pile to be colored are isolated one from the other. The apparatus includes receptacles for receiving the coloring material, said receptacles having upstanding walls which define the design to be applied, and said walls serving to substantially separate the pile from contiguous areas. The apparatus further includes means for applying pressure to the pile thereby causing the pile within the respective receptacles to be in a state of compression, such compression being designed to cause even distribution of all the available coloring material in the receptacle among the portion of the pile entering it, the amount of coloring material present being sufficient to saturate and impregnate the pile but to leave it reasonably dry upon removing the pile from the receptacle.

A further object of the present invention is to provide a novel apparatus for applying a plurality of colors to pile carpeting wherein the carpeting is in roll form and wherein the operation is a continuous one as distinguished from deep dyeing individual strips.

A further object of the invention is the provision of a novel feeding device for feeding coloring material to the color receptacles, wherein the feeding is automatic and all colors feed simultaneously.

A still further object of the invention is the provision of a novel printing form for providing multiple color dyeing.

Further objects and advantages of the present invention will be readily apparent from the following detailed description taken in connection with the accompanying drawings, wherein:

FIGURE 7b is a modified form of the construction shown in FIGURE 7a.

FIGURE 7c is a further modification of the construction shown in FIGURE 7a.

FIGURE 9b is a sectional view taken on the line 9b—9b of FIGURE 9a.

FIGURE 12a is a perspective view of a portion of the machine showing the manner of feeding individual rugs to the platen.

FIGURE 12b is a sectional view taken on line 12b—12b of FIGURE 12a.

Figure 1:
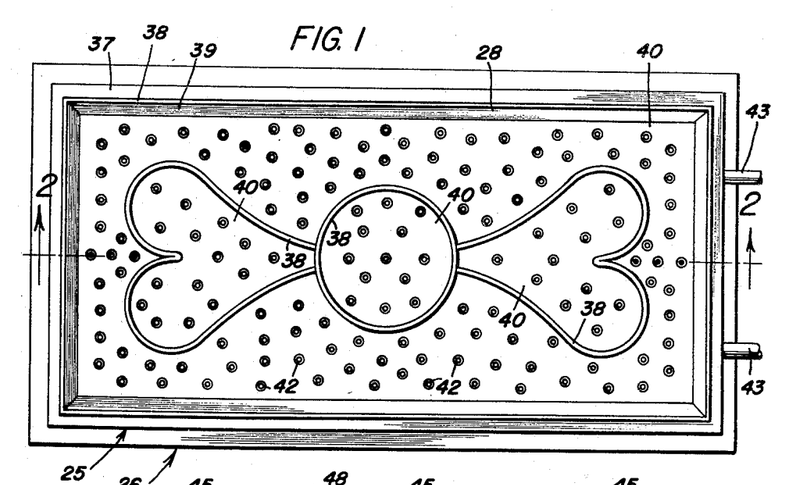
FIGURE 1 is a plan view of the dye carrying portion of the apparatus.
Figure 2:
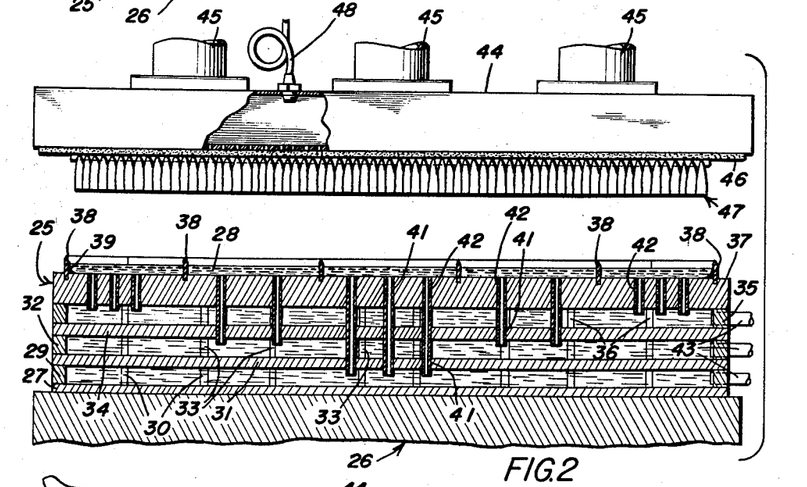
FIGURE 2 is a sectional view taken on line 2—2 of FIGURE 1, and showing carpeting in position for immersion.

An infinite number of varying color designs might be dyed into carpeting by the present invention. For purpose of illustration, FIGURES 1 and 2 disclose the invention confined to a single design adaptation. The printing form shown in plan view in FIGURE 1 and in sectional view in the lower half of FIGURE 2 is indicated by the numeral 25 and is supported upon a base member 26. The printing form 25 may comprise any number of layers, depending upon the number of colors to be used, but for illustrative purposes is shown as a three layer form. The bottom wall 27 may be of metal, plastic or any suitable material having dimensional stability, moisture resistance, and resistance to the chemicals which may be contained in the coloring agents indicated by numeral 28. Around the outside rim of the bottom wall 27 is glued or otherwise tightly secured a border strip 29 of uniform height and which is strong enough to support the top layers and withstand considerable pressure. At certain intervals, spacer columns 30 are secured to the lower wall, such columns being of the same height as the border strip 29. The columns 30 are strong enough to give support and spaced frequently enough to prevent a second wall 31 placed on top of them from buckling under pressure. The inner wall 31 is secured tightly to the border strip and the spacer columns to form a lower sealed compartment. A second layer strip 32 with spacer columns 33, support a second inner wall 34 to form a second sealed compartment. The third compartment is similarly formed with a border strip 35, columns 36 and an upper wall 37. The top wall 37 is somewhat thicker and stronger than the intermediate walls and supports the printing pattern. The printing pattern defines a plurality of receptacles formed by a plurality of upstanding strips 38 imbedded in the top wall 37. The strips 38 are preferably made of rubber, resilient plastic or other elastic or compressible substances for a purpose which will appear. The outer strip 38 is provided with an inclined gasket 39, and the inner strips 38 define various shaped color receptacles 40. Holes 41 are drilled at frequent intervals through the top wall 37 and through as many intermediate walls as is necessary to reach the desired color level. Into these holes are inserted tubes 42 of suitable length to reach the desired level, such tubes fitting snugly into the holes and coated with a sealing substance to produce a perfect seal at the points of penetration. It will be noted, as seen in FIGURE 2, that the upper ends of the tubes are level with the top surface of wall 37. Openings are provided in each of the border strips 27, 32 and 35 to receive tubes 43 which connect each of the compartments with the corresponding color feeding devices to be described.

The top platen which carries the carpeting is shown in FIGURE 2 and is indicated by the numeral 44. Numeral 45 indicates the hydraulic rams which sets the platen in motion. The platen has attached to its underside a sheet of rubber, felt or other resilient substance 46 to the under side of which the pile fabric 47 is secured by any suitable means. For purposes of illustration, the pile fabric is shown secured by vacuum means. To provide for this means the platen is shown as being hollow with the lower wall perforated and a vacuum hose 48 mounted on the top wall and leading to any suitable vacuum source (not shown).

From the foregoing description, the coloring process is a relatively simple operation. The strata printing form 25 is set on top of the base 26, the tubes 43 are then installed to connect the form with the appropriate color feeding devices, which supply a premeasured quantity of coloring agent to the form by means of gravity flow or pressure feeding devices, the amounts of coloring material being calculated so as to yield the desired level of coloring agent in the receptacles 40. With the carpet 47 affixed to the top platen 44, the top platen is forced down by the hydraulic rams 45 to start the pattern dyeing operation.

Figure 3:
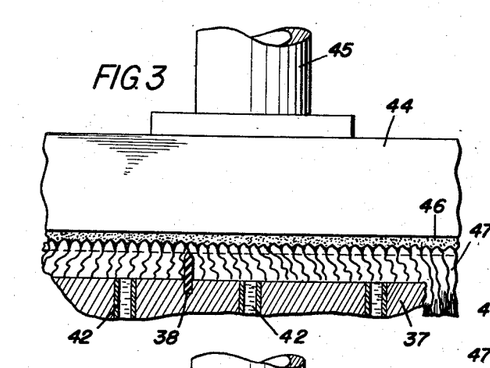
FIGURE 3 is an enlarged detail view showing the pile under compression.

FIGURE 3 shows the carpet pile in a state of compression between the top platen 44 and the surface of the top wall 37 at the bottom of the printing cycle. The dividing walls 38 have fully entered the pile face of fabric 47. As seen in the drawings, these dividing walls are shorter than the pile height of the fabric, causing the fibers to be squeezed and compressed into the coloring agent 28. This pressing and squeezing action forces the coloring agent into the spaces between the compressed fibers, causing them to be evenly and thoroughly impregnated with the coloring agent. The fibers entering the coloring agent displace sufficient volume to force the level of the coloring agent higher as the carpet fibers are compressed into the color receptacle, and the level of the coloring agent, the height of the dividing wall and the pressure exerted by the top platen are calculated in such a way as to cause the level of the coloring agent to rise to the carpet backing, but not beyond it, when the fibers have reached their full state of compression. As illustrated (see FIG. 3), the receptacle walls 38 are substantially shorter than the height of pile on the face of the pile fabric, being one-half the height of the pile or less. By adjusting the three factors of color level, wall height and pressure, penetration of coloring agent can now be minutely predetermined, and the relationship between these three factors will also determine the degree of dryness, or wetness, of the fabric as it is being withdrawn from the printing form. A low level of coloring agent, a low wall height and a great deal of pressure will result in a fabric almost dry to the touch upon emergence from the printing form. A high level of coloring agents, relatively high walls and fairly low pressure will result in a fabric quite wet upon emergence. As the wall height approaches the height of pile, and as pressure drops to negligible proportions, no appreciable compression will take place, and penetration becomes increasingly uneven and imperfect. Droplets of excess color stick to the bottom of the pile, and as the wall height rises above the height of the pile, the fabric emerges so unevenly penetrated and so soaking wet, that further processing or fixing of colors becomes impossible without hopelessly smudging the color and ruining the print.

Figure 4:
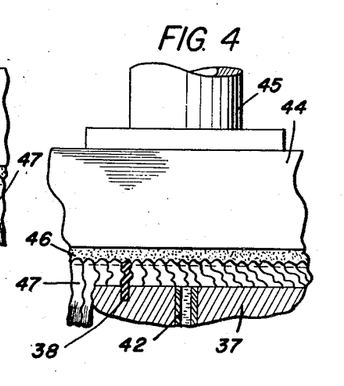
FIGURE 4 is a similar view showing a fabric of shorter pile with the pile under compression.

FIGURE 4 illustrates the advantage of using a rubber or compressible wall 38. To allow for using a given printing form with a variety of different pile heights and fiber densities, the resilient walls 38 are shown under a state of compression. Under the influence of the pressure exerted on the carpet by the top platen, the fibers enter between the rubber walls and compress them to a depth then largely determined by the degree of pressure exerted, rather than by the height of rigid dividing walls. In this manner, one printing form will effectively handle a great variety of fabric constructions.

Figure 5A:
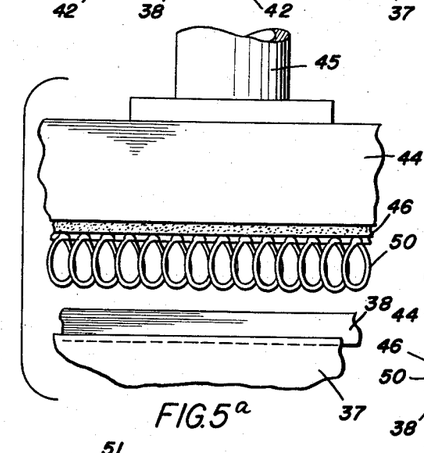
FIGURE 5a is an enlarged detail view of a section of carpeting having a coarse loop construction and prior to immersion.
Figure 5B:
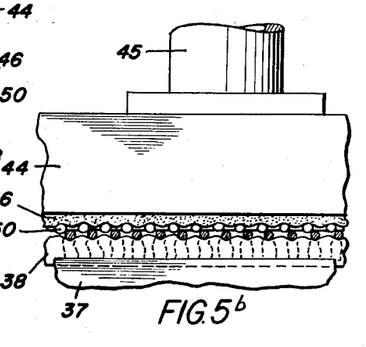
FIGURE 5b is a similar view after immersion and compression.

A further advantage of using a rubber or compressible wall 38 is shown in FIGURES 5a and 5b. Numeral 50 denotes a carpeting of loop construction made of rather coarse yarn in which the loops may be randomly oriented. This makes it difficult for the dividing wall 38 to enter cleanly between the fibers, some of the coarse yarns lying over the ridge of the dividing wall. Upon compression of the fiber, illustrated in FIGURE 5b, the dividing wall 38 acts in effect as a gasket, yielding to the irregularities in the surface and sealing off the color receptacles from each other. Just as important as the gasket effect is the fact that the yielding nature of the rubber permits the carpet to find its own level under uniform pressure across the entire printing area, whereas the accumulation of coarse yarn on the ridge of rigid dividing walls would tend to cause high spots and prevent effective penetration.

Figure 6:
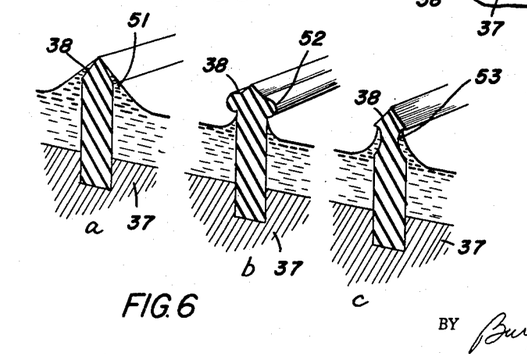
FIGURE 6 is a perspective view of three forms of walls on the dye receptacle.

The liquid levels in proximity with the dividing walls exhibit the phenomenon of the meniscus, which simply stated is the tendency of the liquid to form an upward arc at the point of contact and literally climb up the side of the walls as shown at 51 in FIGURE 6a. In circumstances where the liquid level is relatively high in relation to the dividing walls, this presents a problem. Where the meniscus climbs to the top ridge of the wall, there tends to be diffusion of one coloring agent into the other, causing bleeding and lack of definition. In order to avoid the necessity of making the dividing walls of impractical heights, a barrier is interposed between the meniscus and the top ridge of the dividing wall by means of a bead 52 or recess 53 near the top of the dividing wall, as illustrated in FIGURES 6b and 6c. Whether a bead 52 or a recess 53 is to be used depends on the thickness of the dividing wall, the nature of the material of which it is made, and the surface tension characteristics of the particular coloring agent used.

Figure 7A:
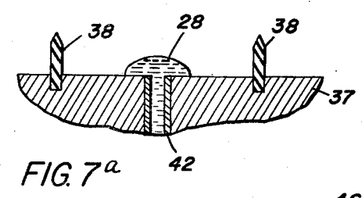
FIGURE 7a is an enlarged sectional view of a portion of the dye receptacle.
Figure 7B:
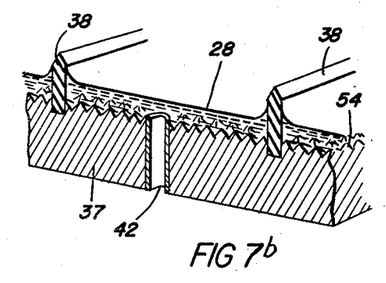
Figure 7C:
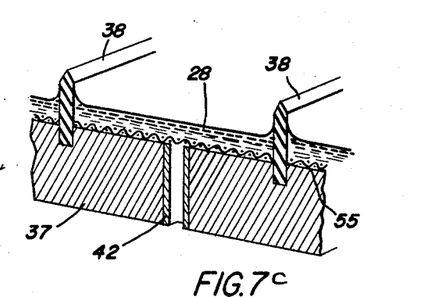

Since it is necessary to achieve fairly thin liquid layers leveling out under the action of gravity on a level surface, another physical phenomenon of liquids, namely surface tension, becomes troublesome. FIGURE 7a illustrates the emergence of coloring agent 28 from dye-feeding tube 42 on a perfectly smooth form surface. It illustrates the tendency of the liquid to form a globule above the tube opening held together by the natural surface tension of the liquid which refuses to spread laterally. Only at the point where the height of the globule enables the liquid to overcome its surface tension by increased gravity, does the globule begin to spread laterally, and fill up the color receptacle. In order to counteract this tendency, FIGURE 7b shows a system of ridging the surface in directions at right angles to each other so as to produce small, pyramidal protrusions 54. The act of thus breaking up the surface causes the liquid to flow instantly, and to spread widely immediately upon emergence from the color-feeding tube 42. What this device accomplishes is to increase the depth of the color level in the low spots and decrease it in the high spots so as to offer a deeper flow level in the valleys while at the same time maintaining the same volume of liquid per square inch of area. By breaking up the surface at the edge of the globule and offering surfaces of various degrees of steepness to the edge of the flow, it overcomes the action of surface tension by taking advantage of the meniscus phenomenon. For certain low color levels, the application of fine wire mesh to the form surface achieves a similar result by maintaining at all times a liquid level below the surface of the wire which tends to draw the freshly fed coloring agent rapidly to the sides. This is illustrated in FIGURE 7c at 55. Sand blasting, disc grinding or similar devices create surface effects promoting the rapid flow of coloring agent depending upon the physical nature of the liquid employed, the workability of the form surface, and the depth of color level desired.

For certain relatively thin plush fabrics, velvets or furnishing fabrics, the color level required is so low that lateral gravity flow cannot be entirely relied on even in the presence of the above flow promoting surface characteristics. In this case the form surface encompassed by the dividing walls is lined with felt, sponge or other absorbent, resilient and compressive material, which is then soaked with coloring agent by the capillary action of the absorbent material drawing the fluid laterally from a sufficient number of bottom feeding openings as is necessary to effect uniform saturation. Upon exerting pressure upon such an absorbent medium, the degree of pressure can be adjusted so as to liberate by compression a sufficiently deep or shallow level of coloring agent so as to effect the thorough penetration and impregnation of the fabric in question.

Figure 8:
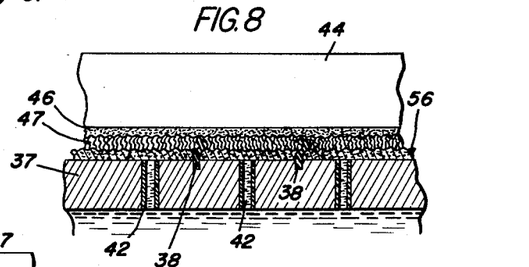
FIGURE 8 is a further modification showing the provision of an absorbent layer and the pile fabric compressed against said absorbent layer.

FIGURE 8 shows the form surface 37 from which protrude dividing walls 38 between which the form surface is lined with an absorbent layer 56 soaking up coloring agent through dye-feeding tubes 42. This figure illustrates the compression of thin pile fabric against the absorbent material 56.

Figure 9A:
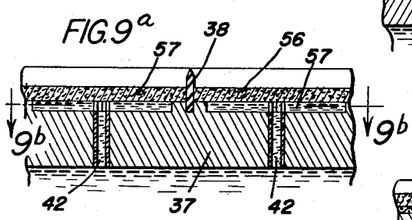
FIGURE 9a is similar to the form shown in FIGURE 8 with channels provided in the receptacle bottom.
Figure 9B:
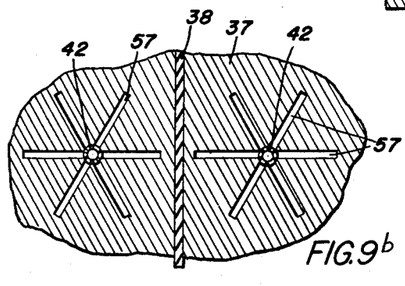
Figure 9C:
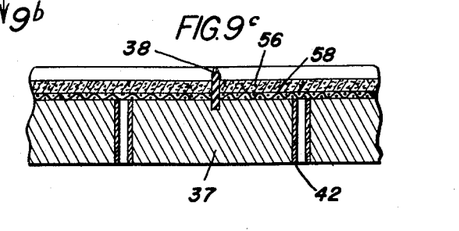
FIGURE 9c is a view similar to the modification shown in FIGURE 8 with the absorbent material resting on a layer of wire screen.

FIGURES 9a, 9b, and 9c illustrate two ways designed to facilitate the rapid wetting of the absorbent layer 56. In the modification shown in FIGURES 9a and 9b, narrow channels 57 are routed in the form surface 37 radially from the mouth of the feeding tubes 42 in order to bring larger areas of the absorbent layer into direct contact with the coloring material. In FIGURE 9c, a layer of wire mesh 58 or the like is shown interposed between the surface of form 37 and the absorbent layer 56 to permit a free flow of the coloring agent beneath the surface of the absorbent layer.

Figure 10:
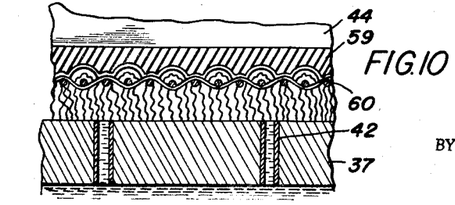
FIGURE 10 is a sectional view of the equipment, showing a sheet of resilient material affixed to the underside of the platen.

Since the backing material of carpeting is often made of rather coarse yarns, and since the loops of tufted carpeting are tufted through the backing material, such backing material often has a very uneven surface of many little bumps and protrusions. If a hard, smooth top platen were applied against such backing material, a lot of small crevices and spaces would be created between the carpet backing and the platen surface. When the pile fabric is compressed into the coloring agent, such coloring agent may be forced through the backing into these crevices, instead of being entrained among the fibers in order to impregnate them. FIGURE 10 represents a large cross section through the equipment at the compression stage of the cycle. The top platen 44 is provided with a layer of rubber, felt or other resilient material 59, which engages the irregular carpet backing 60 in such manner as to yield to the high spots and project into the low spots, thus effectively sealing off the pores of the carpet against undesirable color penetration, and simultaneously aiding in the even exertion of pressure.

Various forms of feeding mechanisms may be employed for supplying coloring material to the pattern receptacles. The exact nature of the feeding mechanisms depend to a certain extent on the viscosity of the coloring agent used. For very thin, free-flowing solutions, it may be sufficient to maintain constant level reservoirs outside the pattern area, the level of which is held constant by a chicken feed or other mechanism at exactly the same horizontal level as the color level in the color receptacles. Since the differential level between reservoir and color receptacle is, at the start of flow, quite small and approaches zero as the color receptacle fills to the desired level, the rate of flow is relatively slow. In order to obtain a more efficient flow, a color metering device is employed which meters out a predetermined coloring agent sufficient to refill all the color reservoirs of that particular color for each printing cycle. This metering device is supported on a table of adjustable height, so that the feeding device can be raised sufficiently above the level of the color receptacles to create additional gravity force to speed the flow of coloring agent. Since the exact quantity for each cycle has been predetermined, the coloring agent tends to level itself out through the intercommunication of color receptacles of the same color in the color strata of the multi-level form. The feeding device is raised or lowered according to the speed of flow desired.

Figures 11, 12C:
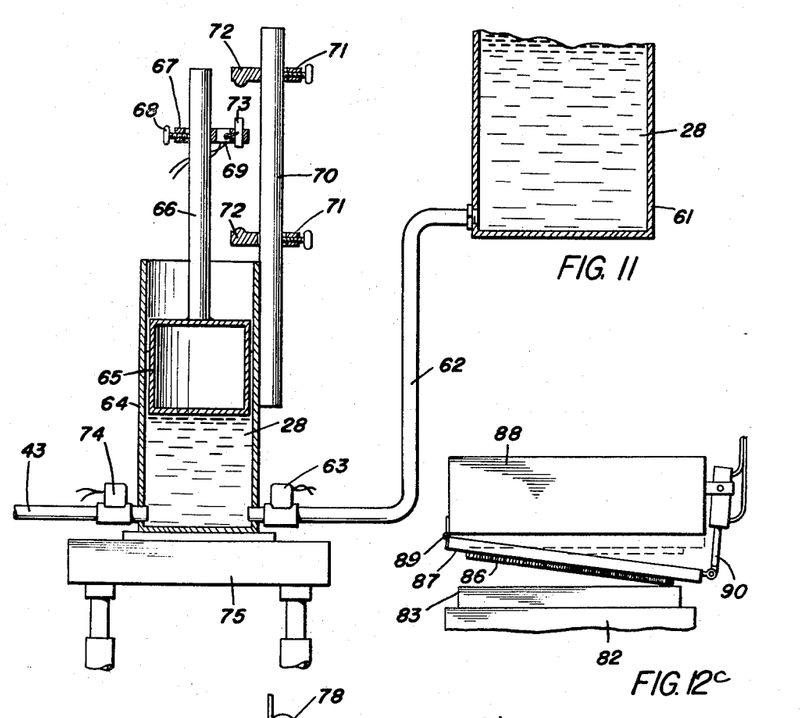
FIGURE 11 is a diagrammatic view of a metering device for feeding coloring material to the dye receptacle.
FIGURE 12c is a detailed view showing one manner of removing a carpet section from the printing form.

Referring to FIGURE 11 which diagrammatically illustrates an efficient form of metering device, numeral 61 discloses a large color supply tank filled with a coloring agent 28. The coloring agent is fed to the metering device through a pipe 62 controlled by a solenoid valve 63. The metering device comprises a cylinder 64, within which freely moves a hollow float 65 which rides up and down with the level of liquid in the cylinder. Attached to the float 65 is a rod 66 on which an adjustable clamp 67 is mounted and held in adjusted position by a set screw 68. The clamp 67 has attached to it a micro-switch 69. Attached to the side of the cylinder 64 is a second rod 70 of a height equal to the full extended height of rod 66. To the rod 70 are attached two adjustable clamps 71, each having protrusions 72 mounted in such manner as to engage activating button 73 of micro-switch 69. The relative positions of clamps 71 determine the limit upper and lower positions of the micro-switch 69. The coloring agent 28 flows from the metering device to the printing form through tube 43, past solenoid valve 74. The entire metering device is supported on an adjustable table 75.

During a typical printing cycle, coloring agent flows out of the full metering device through tube 43 until float 65 has fallen sufficiently for lower projection 72 to engage micro-switch 69 at which moment solenoid valve 74 is closed by the action of micro-switch 69, stopping flow of the coloring agent. When all of the metering devices employed for a particular pattern have completed their downward stroke, and all solenoid valves 74 are closed, top platen 44 is activated on its downward movement to compress the carpet into the printing form while simultaneously all solenoid valves 63 are opened to permit a new charge of coloring agent to flow into cylinders 64 of the metering devices. As the liquid level rises within the cylinder, it lifts float 65 until micro-switch 69 engages the upper projection 72 to shut off solenoid valve 63. As soon as platen 44 is raised to its upper position and has lifted the carpet from the printing form subsequent to compression, it trips a micro-switch which opens solenoid valve 74, permitting color to again flow into the coloring receptacle. This cycle is repeated for each printing operation. The entire operation is electrically synchronized between micro-switch 69, solenoid valves 63 and 74 and movement of the platen 44. The speed of the cycle is determined by the rapidity with which the coloring agent flows into the receptacles, the actual duration of the compression of the carpet in the printing form being almost instantaneous. Synchronized with the above cycle is the feeding of fresh carpeting material into the printing equipment.

While a specific form of metering device has been shown and described, other means such as positive metering pumps can be employed for feeding a predetermined amount of coloring material under a controlled pressure.

Figures 12A, 12B:
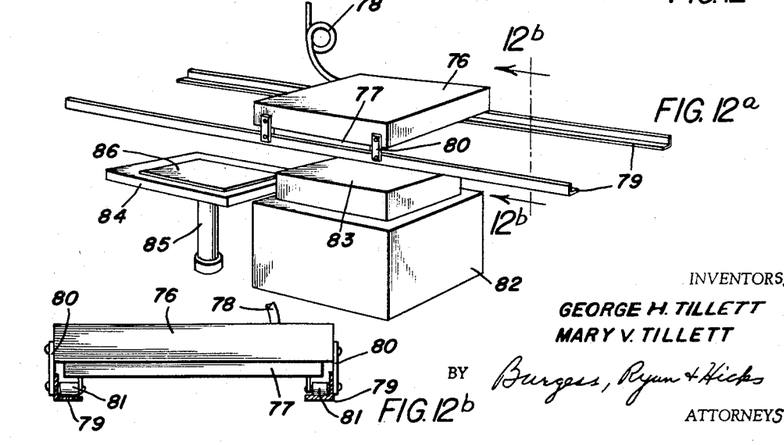

For printing individual rugs, as distinguished from carpeting in roll form, reference is had to the apparatus shown in FIGURES 12a, b and c. In this form of apparatus, the platen 76 includes a hollow perforated plate 77 to which a vacuum hose 78 is connected. Runners 79 are secured to the platen 76 by means of brackets 80 and support the rollers 81 carried by the vacuum plate 77. The bottom platen is indicated by the numeral 82 and supports the printing form 83. A lifting table 84 is raised or lowered by a hydraulic plunger 85 and is shown supporting a carpet 86, face downward. In operation, the hollow plate rolls out to the feed side above the hydraulic table which presses the carpet back against the vacuum plate. The vacuum exerted through the holes in the vacuum plate securely holds the carpet against it with the pile face down. The hollow plate is then moved on its rollers into the top platen which descends upon the printing form 83 and performs the printing operation. The platen is then lifted and the plate rolled to the other side for removal of the printed carpet. The plate is then shuttled back to the feed side to receive a fresh carpet from the hydraulic table. The runners on which this plate moves, being attached to the top platen, ride up and down with the top platen during the printing step.

When the top platen has compressed a large area of carpeting into the printing form surface, it has in the process of compression, expelled much of the air out of the color receptacle and creates upon rising a suction between the carpeting and the color receptacle which is undesirable. To correct this situation, the vacuum plate carrying the carpet, or the top platen, may be made in two parts as seen in FIGURE 12c with the bottom part 87 hinged to the upper part 88 by a hinge 89, with the other side of the bottom part separable from the upper part by a piston or plunger 90. Thus, instead of the vacuum plate or top platen moving upwards from the printing form completely parallel with it, the carpet is peeled from the form by reason of the hinged arrangement.

Figures 13, 14, 18, 19:
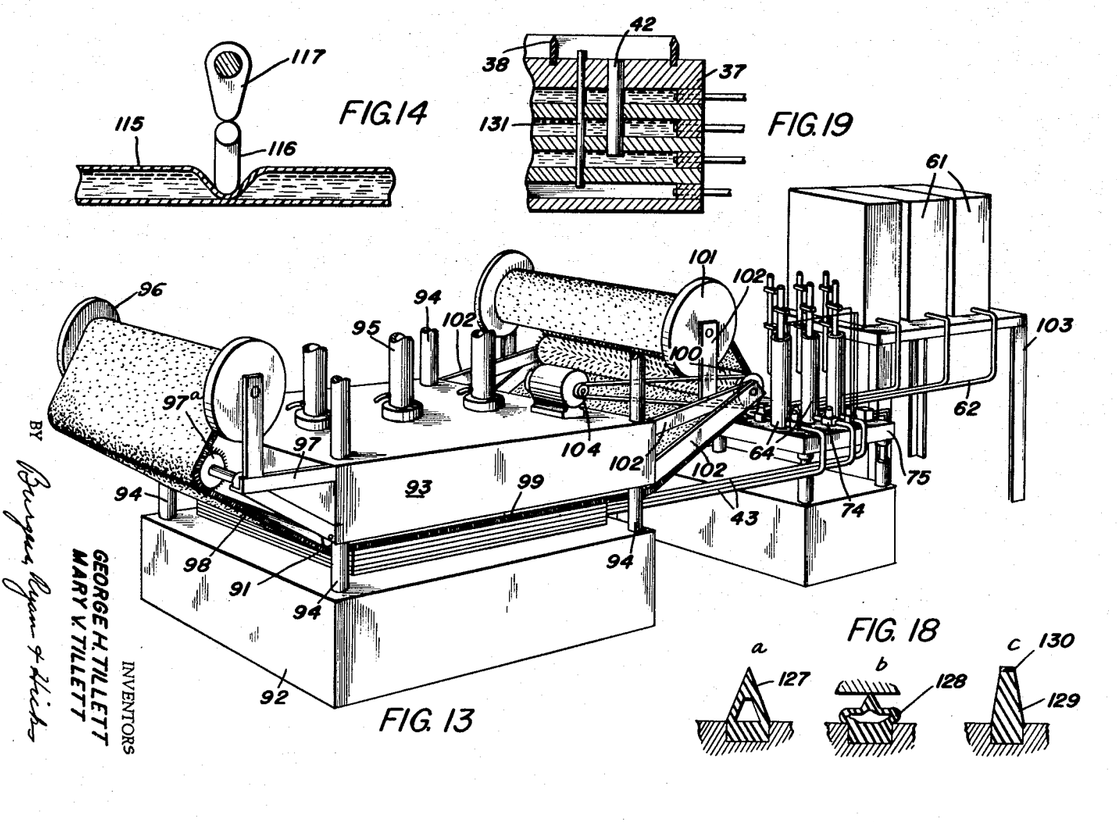
FIGURE 13 is a perspective view of a machine for pattern dyeing a roll of carpet.
FIGURE 14 is a sectional view of a device for cutting off the flow of color from and to the printing form.
FIGURE 18 shows three further modifications of the upstanding walls on the dye receptacle.
FIGURE 19 is a detailed sectional view through a portion of a dye form or receptacle.

FIGURE 13 illustrates a complete assembly of equipment for pattern dyeing a carpet in roll form as distinguished from short lengths of carpeting. The printing form 91 is set on the bottom platen 92 of a flat bed downacting or up-acting hydraulic press. The top platen 93 rides up and down on posts 94 and is activated by hydraulic ram 95. A roll 96 of fresh carpeting is mounted on supports 97 attached to the feed side of the top platen. The carpet 98 is then fed over pin roller 97a, provided with a torque clutch, between the sheet of resilient material 99 on the underside of the top platen and the printing form 91 over pin roller 100 to take-up roll 101, both rollers being held by supporting beams 102 attached to the top platen 93. The force drawing the carpet through the printing machine is exerted by pin roller 100 against the resistance of a slipping clutch or other torque device on pin roller 97a resisting the unrolling of carpet roll 96. Between the negative action of the slipping clutch on pin roll 97a and the positive pull of pin roller 100, the carpet is stretched so tightly as to cling to the bottom of the top platen. The movement of take-up roll 101 is governed by a slipping clutch so that the moist carpeting may be rolled up under steady but light tension.

As previously pointed out, in order to counteract suction on the carpet on parting from the printing form, the upper platen can be hinged as in FIGURE 12c, or the carpet can be relaxed between the two tension rollers 97a and 100, by having suitable mountings for these rollers permitting retraction of the rollers into the platen to provide slack. Small lateral slots may be provided in the upper platen to give air free access to the back of the carpet and promote easy separation. Thus, a slight loop is formed under the tension of the slack fabric, causing separation of the carpet from the form from both sides with the center portion the last to be parted from the form. As soon as the carpet has fully parted from the form, the tension rollers are again extended the full distance from the platen, and the carpet remains under tension until the next parting.

The color levels of the printing form are connected by tubes 43 to the color metering devices 64 supported on the adjustable table 75. The color metering devices are connected to the color storage tanks 61 by tubes 62, said tanks being supported above the top of the metering devices by a stand 103 in order to permit color to flow freely into the metering devices under the force of gravity.

During a typical printing cycle, platen 93 descends until carpet 98 is compressed into form 91. As the platen rises to part the carpet from the printing form, it trips a limit switch which not only causes the metering devices 64 to discharge a fresh quantity of coloring agent into the printing form but also activates a motor 104 driving pin roller 100 to feed fresh carpeting into the machine from carpet roll 96. The forward motion of the carpet is halted exactly at the point where the rear edge of the print in the carpet coincides with the front edge of the form thus exposing fresh carpet above the printing form ready to receive another repeat print. The feeding of the carpet takes place during the upward and downward motion of the platen, and the speed of the equipment is so gauged that the feeding of new carpet is completed by the time the downward motion of the platen again engages the carpet with the printing pattern.

The construction of the printing form must be adjusted when the viscosity of the coloring agent is too high to flow freely under gravity or when the number of colors contained in the pattern is so large and individual color areas of some of these colors so small in relation to overall pattern that construction of a device with perhaps as many as fifteen or twenty-five color levels as illustrated in FIGURE 2 would be impractical.

Figure 15:
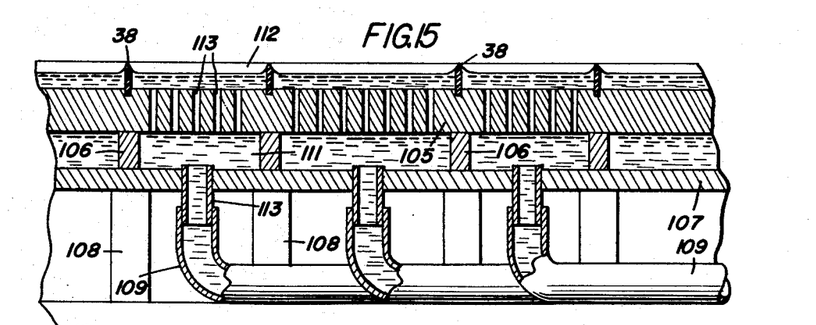
FIGURE 15 is a sectional view of a modified form of a printing form for coloring agents of high viscosity.

For coloring agents of high viscosity, reference is had to FIGURE 15 wherein a suitable form is illustrated. The dividing walls 38 are embedded in a plastic or other suitable sheet 105 which forms the printing surface. Beneath this sheet are glued or otherwise secured a plurality of support strips 106 which follow in outline substantially the pattern made on the surface by dividing walls 38. Against the opposite edges of these support strips 106 is then glued or secured a sealing sheet 107 and around the outside, between the sheets 105 and 107, are placed border strips similar to border strips 29 shown in FIGURE 2. The sealing sheet 107 is supported by columns 108 spaced at sufficiently close intervals not to permit buckling of the top sheets under pressure, but high enough and widely spaced enough to permit color feeding tubes 109 to be introduced between them. This whole assembly rests on a strong bottom sheet 110. The support strips 106 serve to provide color cavities 111 corresponding substantially in shape to the color receptacles 112 on the surface. A large number of small holes 113 are provided in sheet 105 to connect color receptacle 112 with color cavity 111. Into sealing sheet 107, one or more large holes are then drilled into which are set short lengths of tubing 113. To these tubes are attached tubes 109 which connect the color cavities with color feeding devices. Between the printing form shown in FIGURE 15 and the color feeding devices (not shown), short lengths of flexible tubing 115 are inserted, which can all be simultaneously closed off by being compressed by the action of pinch bar 116 activated by a cam 117, as seen in FIGURE 14.

The purpose of this shutting off device is the simultaneous blocking of all color feeding tubes 109 when the carpet is being compressed into the color receptacles 112, since without such shutting off, the color would tend to be forced back into the feeding devices through tubes 109 by the action of the carpet squeezing the coloring agent out of the color receptacles through holes 113. This same purpose is accomplished in FIGURE 11 by the simultaneous closing of all solenoid valves 74. The special closing device of pinch bar 116 in close proximity to the printing form is here necessitated by the fact that tubes 109 leading into the printing form must need be of flexible nature to enter freely in between support columns 108. Such flexible tubing tends to expand along its entire length back to the color feeding devices. Since each color receptacle 112 is now separately fed, it can be efficiently fed with viscous coloring agent of a pre-measured quantity by the positive pressure exerted by metering pumps or similar devices. This pressure forces the viscous coloring agent evenly through the closely spaced holes 113 requiring a minimum of lateral flow on the printing surface. Whereas the printing form in FIGURE 2 requires a metering device for each color, the printing form in FIGURE 15 requires a metering device for each color area. A battery of metering pumps which are freely adjustable over a wide range of feeds, (and which are commercially freely available), has tubes 109 of sufficient lengths attached to each pump. These tubes are then temporarily connected to the particular printing form in the machine and color feeding tubes attached to the pumps from appropriate color storage tanks. When changeover is made to a different printing form, tubes 109 are removed from the tube ends 113, flushed out and connected to the tube ends 113 of the new printing form.

Figure 16:
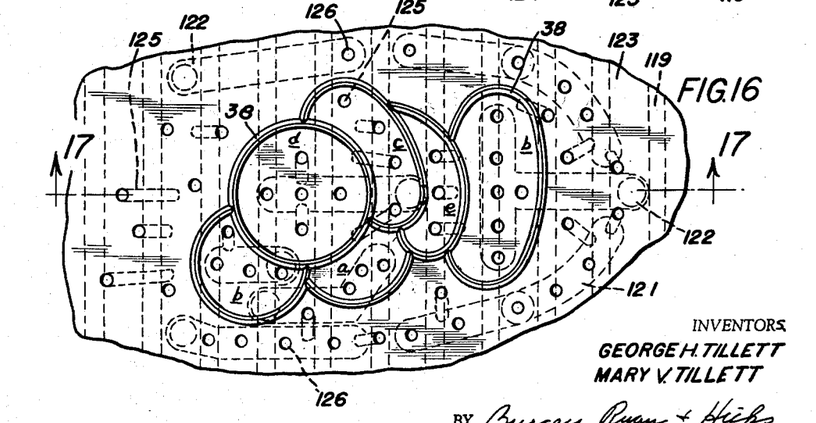
FIGURE 16 is a top plan view of a modified form of a printing form suitable for printing designs in a great number of colors.
Figure 17:
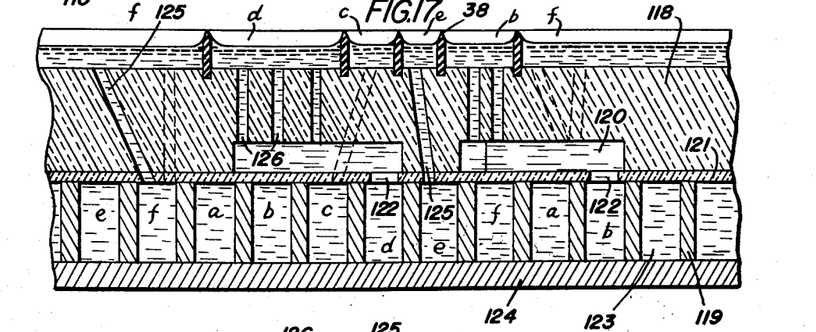
FIGURE 17 is a sectional view taken on line 17—17 of FIGURE 16.

In FIGURES 16 and 17 are illustrated a printing form suitable for printing designs in a great number of colors, or designs on which there are small color accents of different colors on large colored grounds. Dividing walls 38 are set into a very thick sheet of plastic or other preferably transparent material. On the bottom of this thick sheet 118 are outlined the position of channel strips 119. The color areas on the surface are indicated by the code letters of the color they are to receive. Similarly the channel spaces on the bottom of the sheet 118 are indicated by the code letters of the coloring agent they are to carry. Wherever a color channel is laterally so far removed from the color receptacle on top which it is to feed that it could not be reached by angularly drilling through the thick sheet 118, a channel 120 is routed out of the bottom of sheet 118 leading from the channel space carrying the desired color to a spot underneath the surface color receptacle which is to receive that color. When all the necessary channels 120 have been routed, a sealing sheet 121 is glued to the bottom of sheet 118. Holes 122 are now drilled to these routed channels 120 at the spots where they are just above a suitably numbered bottom channel space 123. These bottom channel spaces 123 are formed by channel strips 119 glued or secured to transparent sealing sheet 121 to coincide with their position previously indicated on the bottom of sheet 118. A bottom sheet 124 is then attached to the bottom of channel strips 119, forming the channel spaces 123. Now holes 125 are drilled straight or at an angle down to the corresponding channel space through sheet 118, being careful not to drill through any routed channels 120. Then holes 126 are drilled into the routed channels 120 being careful not to penetrate the sealing sheet 121 into the channel spaces below.

By feeding the appropriate coloring agents into the channel spaces 123, all color receptacles on top will now receive their proper coloring agent regardless of whether or not they happen to be located directly above the proper channel space 123. The channel spaces need of course not carry coloring agent in symmetrical order and any channel space can be assigned any color that happens to be needed in the vicinity of the channel. In this manner, any spot on the surface can be serviced by any of twenty-five colors or more, and in certain designs having small color areas on larger grounds, this system can be used of course in conjunction with the strata method shown in FIGURE 2.

An effective way of feeding channel spaces 123 is to have top sheet 118 extend beyond the printing pattern in the direction of channel strips 119. Color boxes can then be built across the sheet, making the wall any desired height, the bottom of these boxes being that same sheet 118. Within these boxes containing each a separate color, holes are simply drilled through sheet 118 into all the channel spaces 123 which are to carry that particular color. These color boxes in turn are fed by color metering devices.

The upstanding walls forming the dividing walls of the color receptacles may be of any shape, or of any degree of hardness or softness. The structure depends on whether the fabric into which they are to enter is dense or sparse, coarse or fine, and they may be thin or ribbon-like, pyramidal, concave, convex or semi-circular. For certain sparse fabrics it is necessary to use a pyramidal wall with a rather wide base in order to avoid overcoloring the material in proximity to the dividing wall, as shown at 127 in FIGURE 18a. In order to facilitate compression of the wall when made of rubber or similar material, the wall may be hollow in order to permit the tip of the wall to collapse into its center, as shown at 128 in FIGURE 18b.

Where very thin dark lines are desired around color areas in the print in order to improve definition of the design, these can be achieved by having rather blunt top edges on the dividing walls, as shown at 129 in FIGURE 18c. A print roller coated with a generous layer of viscous coloring agent is rolled across the printing form, wetting the top of the ridges with coloring agent 130. When the carpet is printed it picks up sufficient coloring from the top of the ridge as it passes into the color receptacles and will give the final print on the carpet very thin, but well defined outlines.

An additional device to prevent the meniscus action of the liquid coloring agent from causing the liquid to climb to the top of the dividing wall and diffuse into adjacent receptacles consists in taking a water repellant substance such as wax or silicones and coating the top edge of the dividing walls with such a substance by running a print roller coated with it across the printing form in a manner similar to that outlined above for application of thin lines. The repellant substance stops the meniscus and assures greater definition.

FIGURES 12c discloses one method of breaking the vacuum in removing the carpeting from the printing form. An alternative form is shown in FIGURE 19 wherein each color receptacle may be provided with a very thin air tube 131 penetrating through the color form, to be fed with air from below and projecting only very slightly above the bottom of the color receptacle. As the top platen begins to rise, lifting the carpet out of the receptacles, compressed air is shot into the color receptacles through these small tubes counteracting the vacuum created by the suction. Should any dyestuff have entered the air tube during compression of the dyestuff by the carpet, the volume will be so small that its spurting up under the influence of the air will not even show on the fabric.

For single color application the process is adapted to a rotary method. A large number of small contiguous color receptacles are formed by thin upstanding walls made preferably of rubber on a rubber sheet. A roller is then covered with this sheet, or the walls directly formed on a roller with a rubber or other suitable surface. The size of these individual receptacles so formed is large enough to permit free entry of viscous coloring agent into them when the bottom of the roll passes through the coloring agent, but not so large as to permit the coloring agent to run out of the receptacle by gravity when passing upward on the roll toward the pile fabric to be dyed.

Figure 20:
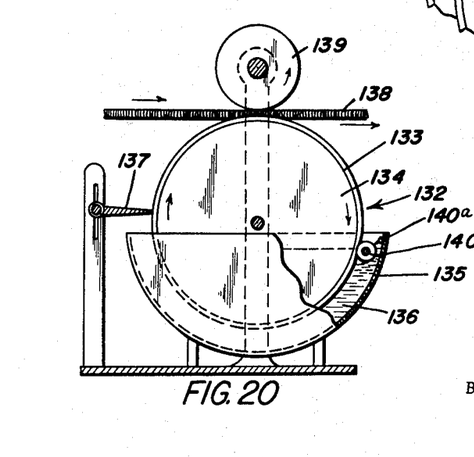
FIGURE 20 is a sectional view of a modified form of machine for applying single colors to carpeting.
Figure 21:
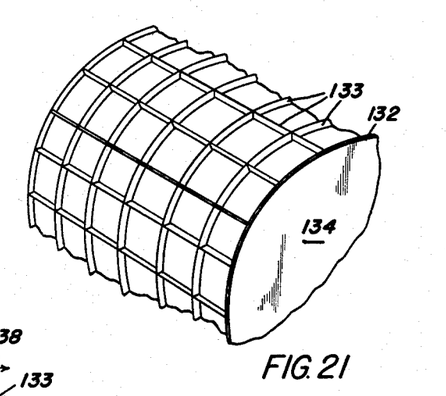
FIGURE 21 is a perspective view of a portion of the roller shown in FIGURE 20.

Referring to FIGURES 20 and 21, numeral 132 designated the rubber walled color paste holder provided with an upstanding wall 133 forming color receptacles similar to the color receptacles previously described. This holder may be mounted on a roller 134 which is partially immersed in a color container 135 holding color material 136. Numeral 137 designates an adjustable doctor blade which can be held perfectly level with the top of the walls in order to fill the individual color receptacles flush with color, or it can be adjusted to exert a slight squeezing action on the rubber walls in order to fill the color receptacles only partially. The carpeting indicated by numeral 138 is fed with its pile downward over roll 134 under pressure exerted against its back by a squeeze roll 139. In order to avoid air bubbles being entrained in the color receptacles on member 132, when these receptacles enter the viscous coloring agent, resilient roller 140 presses against the rubber walls at their point of entry into the coloring agent, compressing and collapsing these walls and expelling all air so that when the rubber walls become upright again they do so underneath the color level and freely receives color without entrainment of air. A doctor blade 140a, supported by the container 135, bears against the roll 140 to keep same clean.

As carpet 138 is pressed into the color receptacles by the action of pressure roll 139, the rubber walls enter between the fibre, the fibres are compressed into the color receptacles, which are empty of color when the carpet leaves the receptacles, having contained just enough color to uniformly penetrate and impregnate the fibres. The walls at the same time prevent any lateral shift or back squeezing of the coloring agent, resulting in a perfectly even uniform coloring action and a perfect consistency and uniformity of fabric color regardless of the length of the run. Since the amount of coloring agent introduced into the fibres is so precisely pre-determined by the formula of the coloring agent and the setting of the doctor blade, and the complete emptying of the color receptacle by the fibre as the fibre passes into and out of the receptacle under compression, identical colors can be achieved even in runs that are weeks apart.

Figure 20A:
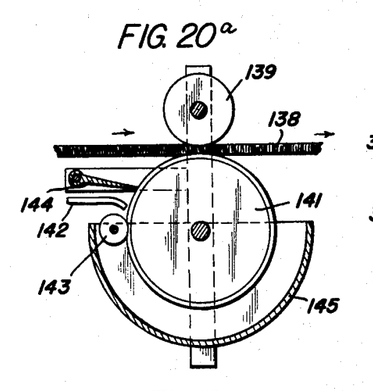
FIGURE 20a is a modification of the machine shown in FIGURE 20.

FIGURE 20a, discloses a modification of the apparatus disclosed in FIGURE 20. The printing roller 141 is similar to the roller 134 but instead of a color container 135 for furnishing the coloring agent to the printing suface, the coloring agent is provided through a nozzle 142 between the squeeze roller 143 and a doctor blade 144. The receptacle 145 serves as a catch basin for excess coloring material.

Figure 22:
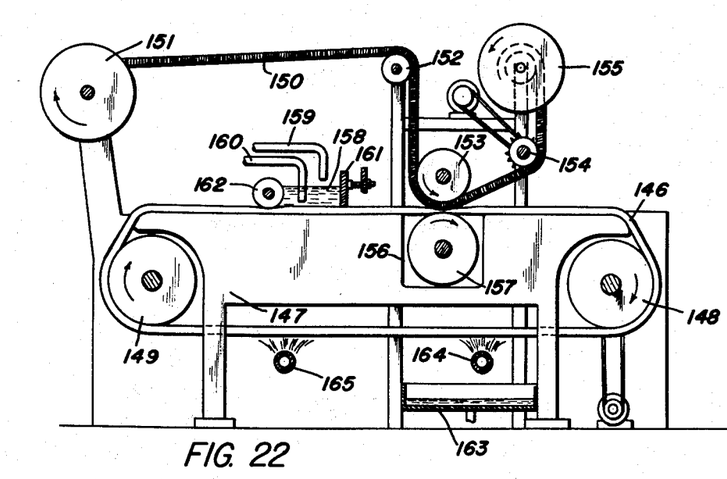
FIGURE 22 is a diagrammatic view of a further modification of a machine useful for applying a single color to carpeting.

FIGURE 22 discloses a modification of the adaptation described in FIGURES 20 and 21 but in place of the roller 134, an endless belt 146 can be employed. This endless belt includes upstanding walls similar to walls 133 to form color receptacles for reception of the coloring agent. The endless belt is movable along the upper surface of stand 147 and rotated about rollers 148 and 149. The carpeting 150 is led off the roll 151 over a roller 152 under the pressure roller 153 over pin roller 154 to take-up roll 155. The stand 147 is cut out at 156 to receive an idle roller 157 which projects slightly above the surface of the stand 147 and cooperates with the pressure roller 153 to compress the carpeting against the color receptacles in the belt in the same manner as previously described. The coloring material 158 is fed to the color receptacle through a color feed tube 159. A suction tube 160 is provided to remove the coloring material when desired. A doctor blade 161 and roller 162 may be provided similar to the doctor blade 137 and roller 140 shown in FIGURE 20. A feature of this arrangement is the fact that the endless belt can be led back underneath the printing surface 147 through a washing chamber 163, operating through a water spray 164 and dried by air pipe 165. Thus, the endless belt is returned to the color feeding side clean and ready to receive a new charge of a different coloring agent.

Figure 23:
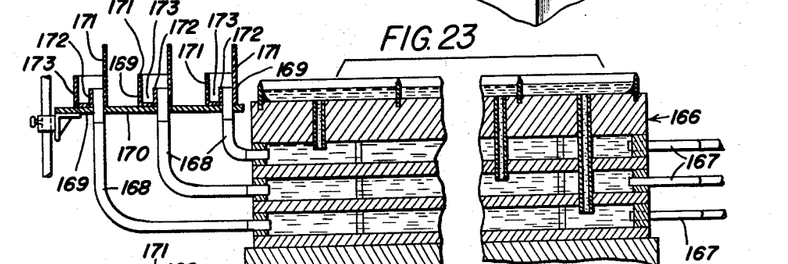
FIGURE 23 is a sectional view through a printing form showing a different method of feeding coloring material.
Figure 24:
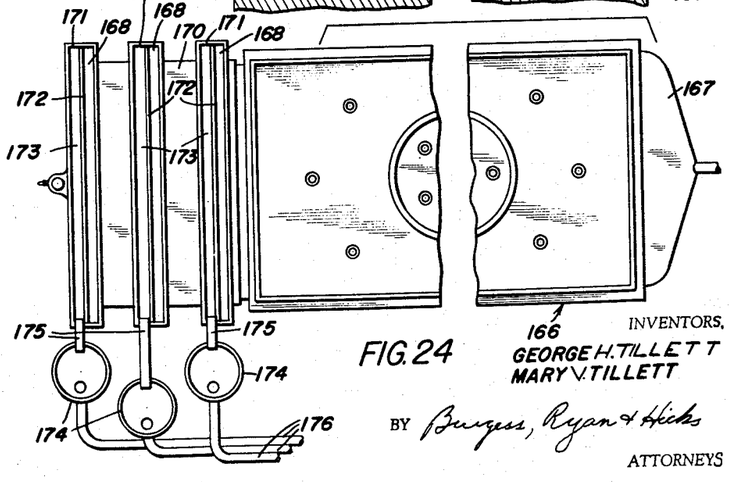
FIGURE 24 is a top plan view thereof.

FIGURES 23 and 24 disclose a modified form of printing form which is adaptable to use with a thin bodied coloring material where it is desired to provide continuous agitation of the material and thus preventing sedimentation. The printing form 166 shown in FIGURES 23 and 24 is similar to the multi-layer form 25 shown in FIGURE 2. However, the tubes 43 of FIGURE 2 are replaced by a wide-necked nozzle 167 leading to each of the levels of the form and at the exit side of the form, similar wide-necked nozzles 168 lead from the form 166. The nozzles 168 are L-shaped and terminate in overflow receptacles 169 supported on an adjustable platform 170. The overflow receptacles consist of upstanding walls 171 and a longitudinal partition 172, the upper edge of which terminates below the walls 171, and forms a channel 173 to receive the overflow from the nozzles 168. Catch basins 174 and additional tubes 176 extend from the catch basins to return the overflow material to the source of supply.

As seen in FIGURE 23, the platform 170 is adjusted with respect to form 166 whereby the upper edge of partition 172 is at a point corresponding with the desired height of the color level in the printing form. Thus, with this arrangement, the color level is always maintained at the desired height by a continuous flow of the coloring material and the continuous flow assures constant agitation of the coloring material. The mechanism shown in FIGURE 14 may be employed to shut off flow during a printing operation.

Figure 25:
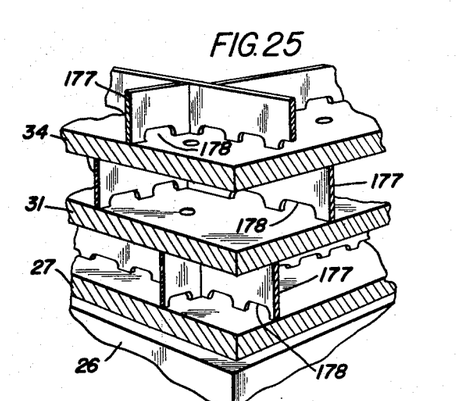
FIGURE 25 is an enlarged detailed view of a modification of the printing form shown in FIGURE 2.

FIGURE 25 discloses a modification of the printing form of FIGURE 2 whereby agitation of the coloring material may be provided in a simple manner. In FIGURE 2, the walls 27, 31, 34 and 37 are maintained in spaced relationship by columns 36. As shown in FIGURE 25, the columns are replaced by partitions 177 having cut-outs 178 at their lower edges. Thus, the coloring material passes through the lower portions of the partitions and promotes agitation of the coloring material.

The mode of operation of the various modifications disclosed will be readily apparent. While we have disclosed and described various embodiments of the present invention, it is apparent that minor changes and further modifications may be made therein without departing from the spirit of the invention, as defined by the claims. While we have disclosed a down-acting press, in dyeing or printing large sized carpeting, it may be desirable to employ an up-acting press since the present inventive concept is adaptable to either type of press. Instead of pin rollers tensioning the carpet between the platens, this may also be achieved by having an endless belt pass between the platens and over the top platen, such a belt suitably supported on rollers, against which the carpet unrolling from the feed roll is pressed and secured by means of adhesive substances, such adhesive substance being of a nature to permit the carpet to be peeled from the belt to the take-up roll.

The pattern dyeing technique outlined above can easily be adapted for use with relatively flat fabrics and shallow pile fabrics through an offset method in which case a piece of carpeting, or any other suitable absorbent medium, becomes the offset plate which absorbs the dye stuff from the color receptacles of the printing form and then transfers it to other fabric by being pressed against it, releasing some of the dye stuff contained within it.

Thus, a plate carrying a piece of carpeting, or absorbent medium, can shuttle between two hydraulic presses, or other suitable devices, receiving dye stuff from the printing form in one press and transferring it to other fabric in the second press to which it has been shuttled on runners, or by any other convenient means.

The printing medium, whether carpet or other absorbent substance, can also be attached to the under side of a free swinging printing plate, supported by two pivoted beams which pivot the plate from the printing form to the fabric to be printed, above which are convenient means for exerting controlled pressure on the printing plate.

Having thus described the invention, what is claimed is:

1. In a machine for the printing and dyeing of pile elements on a pile fabric, such as carpeting, the combination which comprises:
   (a) a printing form comprising a plurality of spaced superimposed layers of sheet-like material,
   (b) said spaced layers including a top layer having a flat upwardly facing printing surface,
   (c) each set of said layers having spaced opposing surfaces forming upper and lower faces of a closed chamber located therebetween,
   (d) walls formed of a flexible, resilient material extending upwardly from the upwardly facing printing surface of the top layer and defining thereon a plurality of open receptacles,
   (e) said walls being adapted to enter into sealing engagement with a face of a pile fabric having pile elements thereon and being substantially shorter in height than said pile elements whereby an area of the pile elements is confined within each of the receptacles and is compressed against the bottom thereof when the face of the pile fabric is brought into sealing engagement with said walls,
   (f) each of said receptacles having at least one opening in the bottom thereof, and
   (g) conduits connecting the openings in each receptacle with one of the closed chambers between the spaced layers.

2. In a machine for the printing and dyeing of pile element on a pile fabric such as carpeting, the combination as defined in claim 1 wherein:
   (a) each of the receptacles has a flat bottom containing a plurality of openings therein for promoting entry of and uniform distribution of coloring material over the bottoms of the receptacles.

3. In a machine for the printing and dyeing of pile elements on a pile fabric, such as carpeting, the combination as defined in claim 1 which includes:
   (a) means for controlling the quantity of coloring material fed to each of the receptacles.

4. In a machine for the printing and dyeing of a pile fabric, such as carpeting, the combination which includes:
   (a) a printing form comprising a plurality of spaced superimposed layers of sheet-like material,
   (b) said spaced layers including a top layer having a flat upwardly facing printing surface,
   (c) each set of said layers having spaced opposing surfaces forming upper and lower faces of a closed chamber located therebetween,
   (d) walls of a flexible and resilient material extending upwardly from the upwardly facing printing surface of the top layer and defining thereon a plurality of open receptacles,
   (e) said walls being adapted to enter into sealing engagement with a face of a pile fabric having pile elements thereon and being substantially shorter in height than said pile elements whereby areas of the pile elements are isolated within the respective receptacles and the pile elements are compressed against bottom faces thereof when the face of the pile fabric is brought into sealing engagement with said walls,
   (f) each of said receptacles having a plurality of openings in the bottom thereof for promoting the flow and distribution of coloring material thereto,
   (g) conduits connecting the openings in the respective receptacles with one of the closed chambers between the spaced layers, and
   (h) means for controlling the quantity of coloring material to each of the receptacles,
   (i) a vertically reciprocable platen positioned in opposing relation to the open receptacles on the printing form.
   (j) means for supporting a length of pile fabric with a portion thereof extending between the printing form and the platen with the pile elements thereon facing the open receptacles on the printing form,
   (k) said platen being movable toward and away from the printing form and engaging with the back of the pile fabric in movement thereof toward the printing form whereby the face of the pile fabric with the pile elements thereon is brought into sealing engagement with the upstanding walls on the printing form and the pile elements are compressed against bottom surfaces of the receptacles in said movement of the platen toward the printing form, and
   (l) means for moving the fabric lengthwise relative to the printing form for a distance equal to the length of the printing form upon movement of the platen away from the printing form.

5. In a machine for the printing and dyeing of pile elements on the face of pile fabric such as carpeting, the combination as defined in claim 4 which includes:
   (a) means for holding the portion of the fabric extending between the platen and the printing form under tension against lengthwise movement relative to the printing form during movement of the platen toward the printing form.

6. In an apparatus for the printing and dyeing of pile elements on a pile fabric, such as carpeting, the combination which comprises:
   (a) a printing form,
   (b) said form including a member having an exposed surface,
   (c) upstanding walls supported on said surface and defining a plurality of open receptacles thereon,
   (d) meniscus barriers formed at the upper ends of said walls,
   (e) said walls being shorter in height than the height of pile elements on a pile fabric to which coloring material is to be applied and being adapted to engage with a face of the pile fabric having pile elements thereon whereby areas of the pile elements are confined within the respective receptacles,
   (f) each of said receptacles being adapted to contain a quantity of coloring material for application to the pile elements of the area confined therein, and
   (g) pressure applying means engaging with the back of the pile fabric in opposing relation to the open receptacles on the printing form, (h) said pressure applying means forcing the face of the pile fabric into engagement with the upstanding walls on the printing form and simultaneously compressing the pile elements thereon against bottom surfaces of the receptacles in the coloring material contained therein.

7. In an apparatus for the printing and dyeing of pile elements on a pile fabric, such as carpeting, the combination which comprises:
(a) a printing form,
(b) said printing form including a sheet-like member having a flat upwardly facing surface,
(c) upstanding walls carried by said upwardly facing surface of the printing form and defining a plurality of open receptacles thereon,
(d) the upstanding receptacle walls being shorter in height than the height of pile elements on a pile fabric to which coloring material is to be applied and being adapted to engage with the face of the pile fabric having pile elements thereon to isolate areas of the pile elements within the respective receptacles,
(e) each of said receptacles being adapted to contain a quantity of a coloring material for application to the pile elements confined therein,
(f) pressure applying means engaging with the back of the pile fabric in opposing relation to the open receptacles on the printing form,
(g) said pressure applying means comprising a vertically reciprocable platen movable toward and away from the receptacles of the printing form,
(h) said platen in movement thereof toward the printing form simultaneously forcing the face of the pile fabric into engagement with the upstanding receptacle walls and compressing the pile elements on the face of the fabric against bottom surfaces of the receptacles and in the coloring material contained therein,
(i) means located at opposite ends of the platen for supporting the pile fabric in the form of rolls with a length of the fabric extending between the platen and the printing form with the pile elements thereon facing the receptacles on the printing form,
(j) means for advancing the fabric for a predetermined distance following each reciprocation of the platen, and
(k) means incorporated in said platen for applying a vacuum to the back of the pile fabric in movement of the pile fabric into sealing engagement with the upstanding walls defining the receptacles on the printing form.

8. In an apparatus for the printing and dyeing of pile elements on a pile fabric, such as carpeting, the combination which comprises:
(a) a printing form,
(b) said printing form including at least one sheet-like member having a flat upwardly facing printing surface,
(c) upstanding walls carried by said upwardly facing printing surface and defining a plurality of open receptacles thereon,
(d) said walls being shorter in height than the height of pile elements on a pile fabric to which coloring material is to be applied and being adapted to engage with a face of the pile fabric having pile elements thereon to confine areas of pile elements within the respective receptacles,
(e) each of said receptacles being adapted to contain a quantity of a coloring agent for application to the pile elements confined therein,
(f) pressure applying means engaging with the back of the pile fabric in opposing relation to the open receptacles on the printing form,
(g) said pressure applying means comprising a vertically reciprocable platen positioned in opposing relation to the receptacles on the printing form and being movable toward and away therefrom,
(h) said platen engaging with the back of the pile fabric in movement thereof toward the printing form and simultaneously forcing the face of the pile fabric into engagement with the upstanding receptacle walls and compressing the pile elements thereon against bottom surfaces of the receptacles, and
(i) means associated with the platen for applying a vacuum to the back of the pile fabric upon movement of the pile fabric into engagement with the upstanding walls defining the receptacles on the printing form.

9. In a machine for the printing and dyeing of pile elements on a pile fabric, such as carpeting, a printing form which comprises:
(a) a plurality of spaced superimposed layers of sheet-like material,
(b) said spaced layers including an upper layer having a flat upper surface,
(c) each set of spaced layers having opposing surfaces forming upper and lower surfaces of a closed chamber,
(d) hollow walls of a resilient flexible material extending upwardly from the flat surface of the upper layer and defining thereon a plurality of open receptacles,
(e) said walls being adapted to enter into sealing engagement with the face of a fabric having pile elements thereon and being shorter in height than said pile elements whereby an area of the pile elements is confined and isolated within each of the receptacles when the face of the pile fabric is brought into engagement therewith,
(f) each of said receptacles having at least one opening in the bottom thereof, and
(g) conduits connecting said openings with one of the closed chambers between the superimposed layers.

10. In a machine for the printing and dyeing of pile elements on a pile fabric, such as carpeting, a printing form which comprises:
(a) a plurality of spaced superimposed layers of sheet-like material,
(b) said spaced layers including an upper layer having a flat upper surface,
(c) each set of spaced layers having opposing surfaces forming upper and lower surfaces of a closed chamber,
(d) walls extending upwardly from the flat surface of the upper layer and defining thereon a plurality of open receptacles,
(e) meniscus barriers extending along the upper edges of said walls,
(f) said walls being adapted to enter into sealing engagement with the face of a fabric having pile elements thereon and being shorter in height than said pile elements whereby an area of the pile elements is confined and isolated within each of the receptacles when the face of the pile fabric is brought into engagement therewith,
(g) each of said receptacles having at least one opening in the bottom thereof, and
(h) conduits connecting said openings with one of the closed chambers between the superimposed layers.

11. In a machine for the printing and dyeing of pile elements on the face of a pile fabric such as carpeting, the improvement which comprises:
(a) a printing form,
(b) said form comprising a plurality of spaced superimposed layers of sheet-like material,
(c) said spaced layers having opposing surfaces defining closed chambers therebetween and including an upper layer having a flat upper surface,
(d) walls extending upwardly from the flat surface of the upper layer and defining thereon a plurality of open receptacles, (e) said walls being shorter in height than the height of pile elements on a pile fabric, (f) each of said receptacles having a bottom surface with at least one opening therein for admission of coloring material thereto, (g) conduits connecting said openings with selected chambers of the closed chambers between the superimposed layers, (h) means for supporting a length of pile fabric in opposing relation to the printing form with the pile elements thereon facing the open receptacles on the form, (i) a vertically reciprocable platen positioned in opposing relation to the printing form with the pile fabric extending between said platen and the printing form, (j) said platen being movable toward and away from the printing form and having a surface engaging with the back of the pile fabric in movement of the platen toward the printing form whereby the face of the pile fabric is brought into sealing engagement with the upstanding walls on the printing form and the pile elements are compressed against the bottom surfaces of the receptacles in said movement of the platen toward the printing form, (k) means for moving the platen toward and away from the printing form, and (l) means associated with the vertically reciprocable platen for applying a vacuum to the back of the pile fabric when the surface of the platen is brought into engagement therewith.

12. In a machine for the printing and dyeing of pile elements on the face of a pile fabric such as carpeting, the improvement which comprises:

(a) a printing form, (b) said form comprising a plurality of spaced superimposed layers of sheet-like material, (c) said spaced layers having opposing surfaces defining closed chambers therebetween and including an upper layer having a flat upper surface, (d) walls extending upwardly from the flat surface of the upper layer and defining thereon a plurality of open receptacles, (e) said walls being shorter in height than the height of pile elements on a pile fabric, (f) each of said receptacles having a bottom surface with at least one opening therein for admission of coloring material thereto, (g) conduits connecting said openings with selected chambers of the closed chambers between the superimposed layers, (h) means for supporting a length of pile fabric in opposing relation to the printing form with the pile elements thereon facing the open receptacles on the form, (i) a vertically reciprocable platen positioned in opposing relation to the printing form with the pile fabric extending between said platen and the printing form, (j) said platen being movable toward and away from the printing form and having a surface engaging with the back of the pile fabric in movement of the platen toward the printing form whereby the face of the pile fabric is brought into sealing engagement with the upstanding walls on the printing form and the pile elements are compressed against the bottom surfaces of the receptacles in said movement of the platen toward the printing form, (k) means for moving the platen toward and away from the printing form, and (l) means located at opposite ends of the platen for tensioning a length of the fabric extending between the platen and the printing form, (m) said tensioning means including a spiked roll carried by the platen at one end thereof.

13. In an apparatus for applying coloring material to pile elements on a face of a pile fabric such as carpeting wherein a pressure applying member engages with a back face of the fabric and forces the face of the fabric with the pile elements thereon into engagement with upstanding walls defining a plurality of receptacles containing coloring material on a printing form under pressure exerted on the back face of the pile fabric, the improvement which comprises:

(a) a printing form having an exposed printing surface, and (b) strips carried on said printing surface and forming upstanding walls defining a plurality of adjoining receptacles thereon for containing coloring material, (c) said adjoining receptacles defining contiguous areas corresponding to areas of the fabric to be colored, (d) said walls having upper edges positioned to enter the pile elements on the face of the fabric in an endwise direction upon movement of the pile fabric toward the printing form and having a height less than the height of said pile elements, (e) said upper edges of the receptacle walls entering into sealing engagement with the face of the pile fabric with contiguous areas of the pile elements being confined within the respective receptacles and simultaneously being compressed against the bottoms of the receptacles and in the coloring material contained therein when the face of the pile fabric is brought into sealing engagement with the upper edges of said walls.

14. In an apparatus for applying coloring material to pile elements on a face of a pile fabric, the improvement as defined in claim 13 wherein:

(a) the upstanding walls defining the receptacles on the printing surface of the form are formed of a resilient material and have a height less than one-half the height of the pile elements on the face of the fabric.

15. In an apparatus for applying coloring material to pile elements on a face of a pile fabric such as carpeting, the combination which comprises:

(a) a printing form having an exposed printing surface, (b) thin strips of a resilient material carried on said printing surface and forming upstanding walls defining a plurality of adjoining receptacles thereon for containing coloring material, (c) said adjoining receptacles defining contiguous areas corresponding to areas of the fabric to be colored, (d) said walls having upper edges positioned to enter the pile elements on the face of the fabric in an endwise direction upon movement of the fabric toward the printing form and having a height substantially less than the height of said pile elements, (e) each of said receptacles being adapted to contain a measured quantity of coloring material for application to the pile elements in one area on the face of the fabric and (f) a member engaging with a back of the pile fabric in opposing relation to the open receptacles on the printing form and exerting pressure thereon, (g) said member simultaneously forcing the free of the pile fabric into endwise engagement with the upper edges of the upstanding walls of the receptacles and comprising pile elements on the face of the fabric against bottom surfaces of the receptacles and in the coloring material contained therein.

16. In an apparatus for applying coloring material to pile elements on a face of a pile fabric, such as carpeting, the combination as defined in claim 15 wherein:

(a) the printing form includes an elongated sheet-like member having a flat upwardly facing surface with the thin strips of resilient material forming the walls of the receptacles being carried on said surface, and (b) the member engaging with the back of the fabric is a vertically reciprocable platen positioned in opposing relation to the receptacles on the printing form and is movable toward and away from the printing form.

17. In an apparatus for applying coloring material to pile elements on a face of a pile fabric, such as carpeting, the combination as defined in claim 16 which includes:
   (a) means for supporting and periodically advancing a length of the pile fabric with a portion of the fabric extending beneath the vertically reciprocable platen with the pile elements on said portion facing the receptacles on the printing form and
   (b) means for applying tension to the portion of the fabric extending beneath the platen.

18. In an apparatus for applying coloring material to pile elements on a face of a pile fabric, such as carpeting, the combination as defined in claim 17 wherein:
   (a) the means for supporting the pile fabric includes supports on which the length of the pile fabric is carried in roll form.

19. In an apparatus for the printing and dyeing of pile elements on a pile fabric, such as carpeting, the combination which comprises:
   (a) a printing form,
   (b) said printing form including at least one sheet-like member having a flat upwardly facing printing surface,
   (c) thin strips carried on said printing surface and forming upstanding walls defining a plurality of adjoining receptacles thereon for containing coloring material,
   (d) said adjoining receptacles defining contiguous areas corresponding to areas of the fabric to be colored,
   (e) said walls having upper edges positioned to enter between the pile elements on the face of the fabric in an endwise direction upon movement of the pile fabric toward the printing surface of the printing form and having a height substantially less than the height of said pile elements,
   (f) said upper edges of the receptacle walls entering into sealing engagement with the face of the pile fabric with contiguous areas of the pile elements being confined within the respective receptacles and simultaneously being compressed against the bottoms of the receptacles and in the coloring material contained therein when the face of the pile fabric is brought into sealing engagement with the upper edges of said walls,
   (g) a vertically reciprocable platen positioned in opposing relation to the receptacles on the printing form and being movable toward and away from the printing form,
   (h) said platen being positioned to engage with the back of the pile fabric and to force the face of the pile fabric with the pile elements thereon into engagement with the upper edges of the receptacle walls in movement of the platen toward the printing form while simultaneously compressing said pile elements against bottom surfaces of the receptacles and
   (i) means for supporting a length of the fabric with the pile elements thereon facing the receptacles under tension and in a fixed position lengthwise relative to the printing form during movement of the platen toward the printing form.

References Cited by the Examiner
UNITED STATES PATENTS

| | | | |
|---|---|---|---|
| 458,904 | 9/91 | Jacobs | 101—288 |
| 800,152 | 9/05 | Hildyard | 101—151 |
| 921,224 | 5/09 | Frost | 101—379 |
| 1,102,884 | 7/14 | Deleuil | 101—114 |
| 1,540,287 | 6/25 | Roehlen | 101—157 |
| 1,668,322 | 5/28 | Kessler | 101—152 |
| 1,813,010 | 7/31 | Ziydin | 101—114 |
| 1,821,302 | 9/31 | Gorner | 101—115 |
| 2,026,021 | 12/35 | Danser | 101—379 |
| 2,137,731 | 11/38 | Soriano | 68—211 |
| 2,273,740 | 2/42 | Terry | 101—149.2 X |
| 2,816,811 | 12/57 | Tillett et al. | 101—115 X |

FOREIGN PATENTS

| | | |
|---|---|---|
| 9,933 | 9/01 | Norway. |
| 651,460 | 10/28 | France. |
| 656,619 | 1/29 | France. |
| 720,325 | 12/31 | France. |

ROBERT E. PULFREY, Primary Examiner.
R. A. LEIGHEY, Examiner.

UNITED STATES PATENT OFFICE
CERTIFICATE OF CORRECTION

Patent No. 3,175,488                      March 30, 1965

Mary Victoria Tillett et al.

It is hereby certified that error appears in the above numbered patent requiring correction and that the said Letters Patent should read as corrected below.

Column 18, line 63, for "free" read -- face --; line 66, for "comprising" read -- compressing --.

Signed and sealed this 17th day of August 1965.

(SEAL)
Attest:

ERNEST W. SWIDER                         EDWARD J. BRENNER
Attesting Officer                           Commissioner of Patents